United States Patent [19]

Porter et al.

[11] Patent Number: 5,718,936
[45] Date of Patent: Feb. 17, 1998

[54] PROCESS FOR PREPARING ROASTED NUTS

[75] Inventors: Ann Porter, Whippany; Randy G. Young, Paterson, both of N.J.

[73] Assignee: Nabisco Technology Company, Chicago, Ill.

[21] Appl. No.: 579,841

[22] Filed: Dec. 28, 1995

[51] Int. Cl.⁶ ............................................. A23L 1/36
[52] U.S. Cl. ........................ 426/289; 426/293; 426/296; 426/302; 426/305; 426/309; 426/312; 426/466; 426/632
[58] Field of Search .............................. 426/93, 289, 293, 426/296, 302, 305, 309, 312, 438, 460, 466, 507, 632

[56] References Cited

U.S. PATENT DOCUMENTS

| | | | |
|---|---|---|---|
| 3,314,800 | 4/1967 | Noznick | 99/127 |
| 4,206,246 | 6/1980 | Mamahit | 426/632 |
| 4,769,248 | 9/1988 | Wilkins | 426/291 |
| 5,149,562 | 9/1992 | Hebert | 426/632 |

*Primary Examiner*—Milton Cano
*Attorney, Agent, or Firm*—St. Onge Steward Johnston & Reens LLC

[57] ABSTRACT

A process for preparing roasted nuts is presented. The process includes exposing raw nuts to a brine solution under conditions effective to provide a coating of salt on the nuts; applying to the nuts a coating of fine salt having a particle size such that at least about 80% of the salt passes through a 125 micron mesh and at least about 40% of the salt passes through a 44 micron mesh; and roasting the nuts under conditions effective to impart a roasted nut color, flavor and aroma to the nuts.

16 Claims, 1 Drawing Sheet

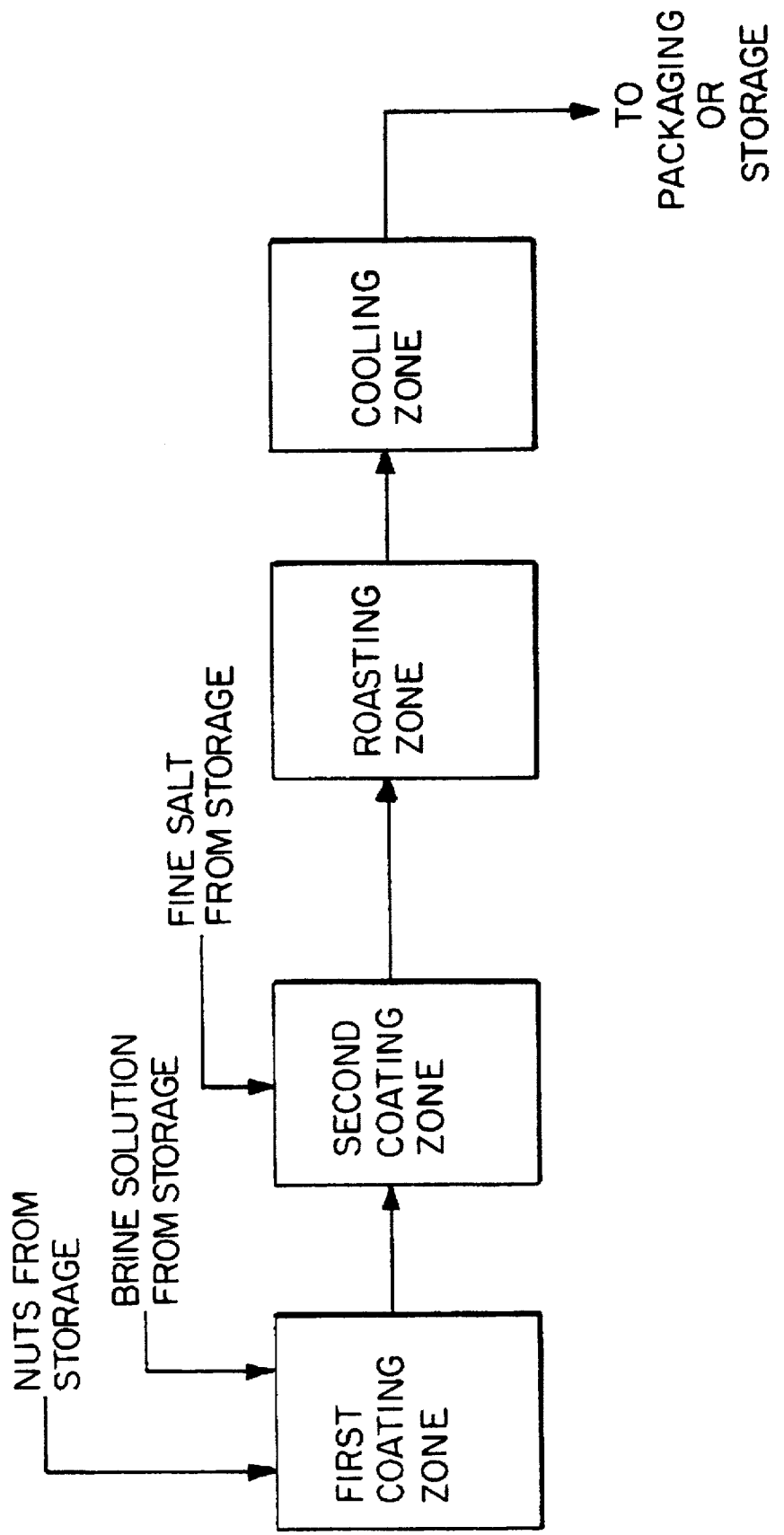

5,718,936

PROCESS FOR PREPARING ROASTED NUTS

TECHNICAL FIELD

This invention relates to the preparation of coated roasted nuts. More particularly, this invention relates to a process for preparing coated roasted nuts which mimic the taste and appearance of roasted nuts freshly extracted from the shell.

The preparation of nuts for consumer consumption which mimic the characteristics of nuts from the shell (such as those often available at ball parks and other sporting venues) has long been sought. The perception is that nuts in the shell are fresher than canned or jarred nuts, although it is often untrue. However, if the taste and appearance of nuts freshly extracted from the shell is duplicated, a desirable sensory experience is provided to the consumer.

BACKGROUND ART

In U.S. Pat. No. 3,314,800, Noznick et al. discuss the application of salt to nuts, and attempt to overcome the problem of poor salt adherence by first dry roasting nuts and then applying a coating of wheat gluten to the nuts while still hot. Noznick et al. further suggests the application of salt and gluten in a single wet phase. The method of this patent has several drawbacks, including the undesirable requirement of coating the nuts while still hot and the limited number of seasoning which can be combined with gluten in a single wet phase. Salt can then be applied either with the gluten or thereafter.

Wilkins et al., in U.S. Pat. No. 4,769,248, disclose the application of a starch pre-dust, a coating of a gelatin solution and then a coating of a seasoning mix which may contain salt prior to dry roasting the nuts. These nuts show superior coating adherence of the seasoning mix applied thereto. Similarly, Herbert et al. teach the application of a gelatin powder, followed by a gelatin solution in order to increase the adherence of a coating of a seasoning mix which may contain salt, in U.S. Pat. No. 5,149,562.

In U.S. Pat. No. 4,206,246, Mamahit discloses immersing peanuts in a brine which had been boiling and is then cooled to just below the boiling point, and which may contain various flavorings. The nuts are then oil roasted.

Unfortunately, nothing in the prior art has been successful in producing peanuts which mimic the roasted peanut taste and texture obtained from peanuts roasted in the shell, such as peanuts sold at sporting events and other like venues. It has now been found, surprisingly, that the use of a dual coating process with a brine solution and then a fine salt can achieve such a peanut.

DISCLOSURE OF THE INVENTION

This invention relates to a process for producing roasted nuts and the nuts produced thereby. More particularly, this invention relates to a process wherein, in a first step, raw nuts are exposed to a brine solution, preferably a brine solution super-saturated with salt. In a second step, the nuts are provided with a coating of a fine salt, by which is meant salt wherein at least about 80% of the particles will pass through a US 120 mesh screen, and at least about 40% of the particles will pass through a US 325 mesh screen. The resulting nuts are then roasted, most preferably dry roasted. The use of the two salt coating steps has been found to provide a flavor nut and texture not before seen in the prior art.

DESCRIPTION OF THE DRAWING

This invention will be better understood and its advantages will become more apparent from the following detailed description, especially when read in light of the attached drawing, which is a flow sheet schematically illustrating one embodiment of the process of the invention.

DETAILED DESCRIPTION OF THE INVENTION

The nuts which are treated in accordance with this invention can be any edible nuts which are conventionally packaged and sold as snack-type products or which are utilized for decoration or as fillers in the confectionery and baked foods industries. Illustrative of such nuts are peanuts, cashews, almonds, walnuts, filberts, macadamia nuts, pecans and the like. Particularly preferred are peanuts.

The nuts are deshelled in a preliminary step and, optionally, may also be subjected to other conventional procedures such as blanching prior to being subjected to the process of the invention. The term "raw nuts" is used hereinafter to refer to nuts in the form in which they are subjected to the first step of the process of the invention, irrespective of any preliminary treatment which has been applied to the nuts. Thus, white roasted nuts and nuts which have been subjected to a process to remove a portion of their fat content are included within the meaning of this term.

In an initial step of the inventive process, the raw nuts are exposed to a brine solution under conditions effective to provide a coating of salt on the nuts. By brine solution is meant an aqueous solution containing a large amount of salt, even to the point of super-saturation. There is no specific particle size requirement for the salt employed, provided the particle size is not so large as to inhibit the desired amount of salt from dissolving in the brine solution. Typically, the salt employed in common table salt or equivalent.

The brine solution should preferably contain at least about 17% salt and more preferably at least about 20% salt. In order to maintain the desired amount of salt in the brine solution, the brine solution should be heated in order to dissolve the salt, preferably to at least about 150° F. Most preferably, the brine solution is heated to at least about 160° F. and an amount of salt sufficient to form a saturated, or even super-saturated, solution (i.e., typically about 22% or more) is employed.

The nuts are exposed to the brine solution under conditions effective to provide a coating of the salt from the brine solution on the nuts. More advantageously, the nuts are exposed to the brine solution under conditions effective to impregnate at least some of the salt from the solution into the nuts.

Exposure of the nuts to the brine solution can be performed using conventional coating means and conditions effective for uniformly coating or exposing the nuts to the brine solution. Advantageously, exposure is accomplished in a conventional coating drum. The nuts are introduced into the drum and an appropriate mount of the brine solution is introduced while providing agitation by rotating the drum until the nuts are exposed to the brine solution. Preferably, particularly when this process is being performed on a continuous basis as described more fully below, the nuts and brine solution are introduced into the coating dram simultaneously in the appropriate proportions, and rotation of the drum is carried out as before until uniform exposure is achieved.

The brine solution is employed so as to provide salt to the nuts at the level of at least about 0.4 pounds of salt in the brine solution per 100 pounds of nuts. More preferably, the brine solution is provided in an mount to provide salt at a level of at least about 0.55 pounds of salt per 100 pounds of nuts. Assuming a level of salt in the brine of 20%, this dictates that the brine solution be added to the nuts at a level of at least about 2 pounds per 100 pounds of nuts, more preferably 2.75 pounds of brine solution per 100 pounds of nuts. When the brine solution is at a different salt concentration, the amount of brine solution to be used can be calculated by dividing the percentage of salt to be applied to the nuts by the concentration of the salt in the brine solution, each number expressed as a decimal (in other words for a 17% brine solution with a desired application rate of 0.55 of salt pounds per 100 pounds of nuts, the amount of brine solution to be applied equals 0.55 divided by 0.17, or 3.24 pounds of brine solution per 100 pounds of nuts).

In order to maintain the salt in the brine solution, and also to facilitate the coating and impregnation of the nuts by the salt in the brine solution, the brine solution should preferably be at a raised temperature when the nuts are exposed to it. More specifically, the brine solution should be at a temperature of at least about 120° F. and more preferably at least about 140° F. to facilitate the coating process. The nuts and brine solution should be tumbled together for at least about 1 minute and more preferably for from about 2 to about 3.5 minutes in order to uniformly coat and impregnate the nuts.

After the nuts have been exposed to and coated and/or impregnated by the brine solution, the thusly prepared nuts are coated with a fine salt. By free salt is meant a microsized, or extremely small particle, salt. Advantageously, the fine salt used in the process of the present invention has a particle size such that at least about 80% and more preferably at least about 90% of the salt particles will pass through a US 120 mesh screen, and at least about 40% and more preferably at least about 50% of the free salt will pass through a US 325 mesh (44 micron) screen. In other words, at least about 80% of the salt particles have a diameter of less than 125 microns, and at least about 40% of the salt particles have a diameter less than 44 microns. More preferably, at least about 93% of the salt will pass through the 120 mesh screen and at least about 60% of the salt particles will pass through a 325 mesh screen.

The fine salt is applied to the nuts in an amount of at least about 0.85 pounds of salt per 100 pounds of nuts. More particularly, the fine salt is applied in an amount of at least about 1 to about 1.8 pounds of fine salt per 100 pounds of nuts.

The coating of the nuts with the fine salt can be performed using conventional means, such as a coating drum of the type described above and can be carried out immediately after the brine solution exposure operation is completed. Indeed, although a separate coating drum is preferred, the nuts can still be present in the coating drum employed for the brine solution during the fine salt coating operation.

The nuts are then roasted. The roasting process is preferably dry roasting (i.e., roasting in the substantial absence of added oil, usually less than about 10% oil by weight of the nuts, and most preferably none) although oil roasting can also be effected. Typically, the nuts are roasted to a moisture content of less than about 3% preferably less than about 2%, and most preferably about 1.5% or less. The degree to which the nuts are roasted should correspond to an Agtron color photometer reading of about 60 to about 95 in the green mode with 12% and 33% plates defining the reading scale. Most preferably, the reading will be within the range of about 80 to about 90, to thus impart a roasted nut color, flavor and aroma to the nuts.

When dry roasting (i.e., air or granular roasting), the nuts are roasted in any suitable manner which gives them the characteristic taste and texture of roasted nuts as described above. In air roasting, the nuts are roasted in a stream of hot air at a temperature of about 250° F. to about 400° F., advantageously about 270° F. to about 335° F. Roasting times and temperatures can be varied depending on the particular type of nut being processed, as well as the roasting temperature and degree of roasting desired. Illustratively, the time and extent of roasting will be greater for peanuts (i.e., about 10 minutes to about 35 minutes) than for cashews (i.e., about 3 minutes to about 15 minutes). The most appropriate conditions to be adopted in any particular instance can be readily determined by the skilled artisan.

In granular roasting, the nuts are contacted with a finely divided heat transfer media which is heated to a temperature of about 315° F. to about 465° F., preferably about 380° F. to about 410° F. Roasting times and temperatures will vary depending on the particular type of nut being processed and the degree of roasting desired. Illustratively, the time and extent of roasting will be greater in the case of peanuts (i.e., about 1 minute to about 9 minutes) than in the case of cashews (i.e., about 30 seconds to about 3 minutes).

The finely divided heat transfer media can be any suitable finely divided material which will absorb heat from a heat source such as a flame, and transfer the heat to the nuts upon contact. Preferably, the finely divided heat transfer media is salt, ceramic beads, sand, or metal balls, most preferably ceramic beads.

Oil roasting involves the roasting of the nuts in an edible oil, such as refined peanut oil at a temperature in the range of about 240° F. to about 350° F., preferably from about 285° F. to about 325° F., and for a time which will vary depending upon the particular type of nut being processed and upon the temperature roasting and the degree of roasting desired. In one embodiment, the nuts can be oil roasted by carrying them on a mesh belt through a heated bath of the roasting oil.

Illustratively, the time and extent of roasting will be greater in the case of peanuts (from about 4.5 to about 14 minutes) than in the case of cashews (from about 1.5 to about 7 minutes). Most appropriate roasting conditions to be adopted in any particular instance can be determined readily by the skilled artisan.

The nuts prepared in accordance with the process of the invention are characterized by improved overall appearance especially coating uniformity, improved flavored and improved physical characteristics. More specifically, the nuts resemble, in both taste and appearance, nuts which have been roasted in the shell such as those available in sporting arenas.

The flow sheet shown in the figure illustrates a continuous process for roasting nuts in accordance with the invention. In the first step of this process, the nuts are conveyed by continuous belt conveyor or like means to the first coating zone, wherein the nuts are exposed to the brine solution, generally at a temperature of at least about 120° F., in an amount of at least about 0.4 pounds of salt in the brine solution to 100 pounds of the nuts. The first coating zone comprises any mechanical continuous coating means commonly employed in the coating art. Illustrative of such apparatus are revolving coating drums in which the nuts are caused to ramble to provide even distribution of the brine solution about the nuts. Advantageously, the coating apparatus takes the form of a cylindrical coating drum mounted with its longitudinal access aligned at a slight angle to the horizontal, with the entry port at the elevated end and adapted to rotate at a rate effective to impart a tumbling action to the nuts and to cause the nuts to be propelled towards the exit port of the device.

Alternatively, the coating apparatus employed in the first coating zone may comprise an open trough having a semi-circular cross section which is provided with agitating and propulsion means, such as a rotating helical auger for imparting the tumbling action necessary to insure uniform coating to the nuts, and, at the same time, for causing the nuts to be conveyed at a rate along the length of the first coating zone which insures pickup of the proper amount of coating in the proper consistency.

The combined mix of the nuts and the brine solution is tumbled as it is advance through the zone, typically for at least about 1 minute and more preferably for about 2 to about 3.5 minutes.

The fine salt can be applied to the nuts in a separate coating apparatus, the second coating zone, to which the stream of coated nuts is conveyed by means such as a continuous conveyor belt or the like. The second coating zone can take the form of any of the apparatus described and exemplified with respect to the first coating zone. Tumbling is continued for about 1 minute to permit the nuts to pick up and hold the fine salt. This will typically be achieved in less than 1 minute of tumbling, e.g., about 40 seconds or less. Alternatively, the fine salt on the nuts can be blended by continuing to tumble and advance the nuts in a latter section of the first coating zone.

The nuts are then conveyed via appropriate means such as a continuous conveyor belt or the like to a roasting zone wherein the nuts are subjected to roasting by the methods described above, particularly dry roasting. The apparatus employed in any given instance depends both on the type of roasting desired and the particular nut being roasted. The apparatus employed in the roasting zone can be any of the air or oil roasting devices known in the art which are capable of operation on a continuous basis.

Upon exiting the roasting zone, the nuts can be conveyed to a cooling zone in which the temperature of the nuts is reduced rapidly, illustratively within a period of about 5 minutes and preferably less than about 2 minutes, to a temperature below about 100° F. This operation serves to insure that excessive roasting of the nuts because of maintenance of the higher temperatures at which the nuts emerge from the previous step, does not occur. This later zone advantageously comprises a closed or partially closed area through which air or inert gas, at temperatures of about 100° F. or less, is caused to flow at a rate sufficient to achieve the desired reduction in temperature of the nuts. The efficiency of this cooling step is greatly enhanced by transporting the nuts through the cooling zone on a conveyor belt which is perforated to permit passage therethrough of cooling air or inert gas. A particularly preferred embodiment employs a continuous wire mesh belt conveyor permitting maximum contact between cooling gas and the nuts.

In a feature of the continuous process of the invention, the nuts are agitated by a horizontal or mechanical mixer as they are being transferred from the roasting zone to a cooling zone (if employed) or within the cooling zone. The operation is designed to effect separation or singularization of the individual nuts. This can be achieved in any convenient manner such as by employing an oscillating belt conveyor or by operating the belt conveyor onto which the flow of nuts is discharged from the roasting zone at a faster speed than the stream of nuts is moving as it exits that zone. The sudden acceleration in rate of movement of the nuts serves to achieve the desired separation. The nuts can then be provided to storage or packaging as desired.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention as defined in the appended claims. The claims are meant to cover the claimed components and steps in any sequence which is effective to meet the objectives there intended, unless the context specifically indicates the contrary.

What is claimed is:

1. A process for preparing roasted nuts, which comprises:

(a) exposing raw nuts to a brine solution under conditions effective to provide a coating of salt on the nuts;

(b) applying to the nuts a coating of fine salt having a particle size such that at least about 80% of the salt passes through a 125 micron mesh and at least about 40% of the salt passes through a 44 micron mesh; and (c) roasting the nuts under conditions effective to impart a roasted nut color, flavor and aroma to the nuts.

2. The process of claim 1, wherein the brine solution comprises an aqueous solution which comprises at least about 17% salt.

3. The process of claim 2, wherein the brine solution comprises at least about 20% salt.

4. The process of claim 3, wherein the brine solution is at a temperature of at least about 120° F. when the nuts are exposed thereto.

5. The process of claim 1, wherein the nuts are exposed to the brine solution at a level of at least about 0.4 pounds of salt in the brine solution per 100 pounds of nuts.

6. The process of claim 1, wherein the fine salt has a particle size such that at least about 93% of the salt passes through a 125 micron mesh and at least about 60% of the salt passes through a 44 micron mesh.

7. The process of claim 6, wherein the nuts are coated with at least about 0.85 pounds of fine salt per 100 pounds of nuts.

8. The process of claim 1, wherein the nuts are dry roasted.

9. A process for preparing roasted nuts, which comprises:

(a) continuously feeding raw nuts through a first coating zone;

(b) exposing the nuts to a brine solution in the first coating zone;

(c) continuously feeding the brine-exposed nuts to a second coating zone;

(d) applying to the nuts a uniform coating of a fine salt having a particle size such that at least about 80% of the salt passes through a 125 micron mesh and at least about 40% of the salt passes through a 44 micron mesh, in the second coating zone; and (e) continuously conveying the nuts through a roasting zone in which the nuts are roasted under conditions effective to impart a roasted nut color, flavor and aroma to the nuts.

10. The process of claim 9, wherein the brine solution comprises an aqueous solution which comprises at least about 17% salt.

11. The process of claim 10, wherein the brine solution comprises at least about 20% salt.

12. The process of claim 11, wherein the brine solution is at a temperature of at least about 120° F. when the nuts are exposed thereto.

13. The process of claim 9, wherein the nuts are exposed to the brine solution at a level of at least about 0.4 pounds of salt in the brine solution per 100 pounds of nuts.

14. The process of claim 9, wherein the fine salt has a particle size such that at least about 93% of the salt passes through a 125 micron mesh and at least about 60% of the salt passes through a 44 micron mesh.

15. The process of claim 14, wherein the nuts are coated with at least about 0.85 pounds of fine salt per 100 pounds of nuts.

16. The process of claim 9, wherein the nuts are dry roasted.

* * * * *

UNITED STATES PATENT AND TRADEMARK OFFICE
CERTIFICATE OF CORRECTION

PATENT NO. : 5,718,936
DATED : February 17, 1998
INVENTOR(S) : Porter, et. al.

It is certified that error appears in the above-indentified patent and that said Letters Patent is hereby corrected as shown below:

At Column 2, line 54, "mount" should be replaced with --amount--.

At Column 2, line 59, "dram" should be replaced with --drum--.

At Column 2, line 66, "mount" should be replaced with --amount--.

At Column 3, line 26, "free" should be replaced with --fine--.

At Column 3, line 32, "free" should be replaced with --fine--.

At Column 4, line 56, "ramble" should be replaced with --tumble--.

Signed and Sealed this

Twenty-fifth Day of August, 1998

Attest:

BRUCE LEHMAN

*Attesting Officer*  *Commissioner of Patents and Trademarks*